Figure 1:
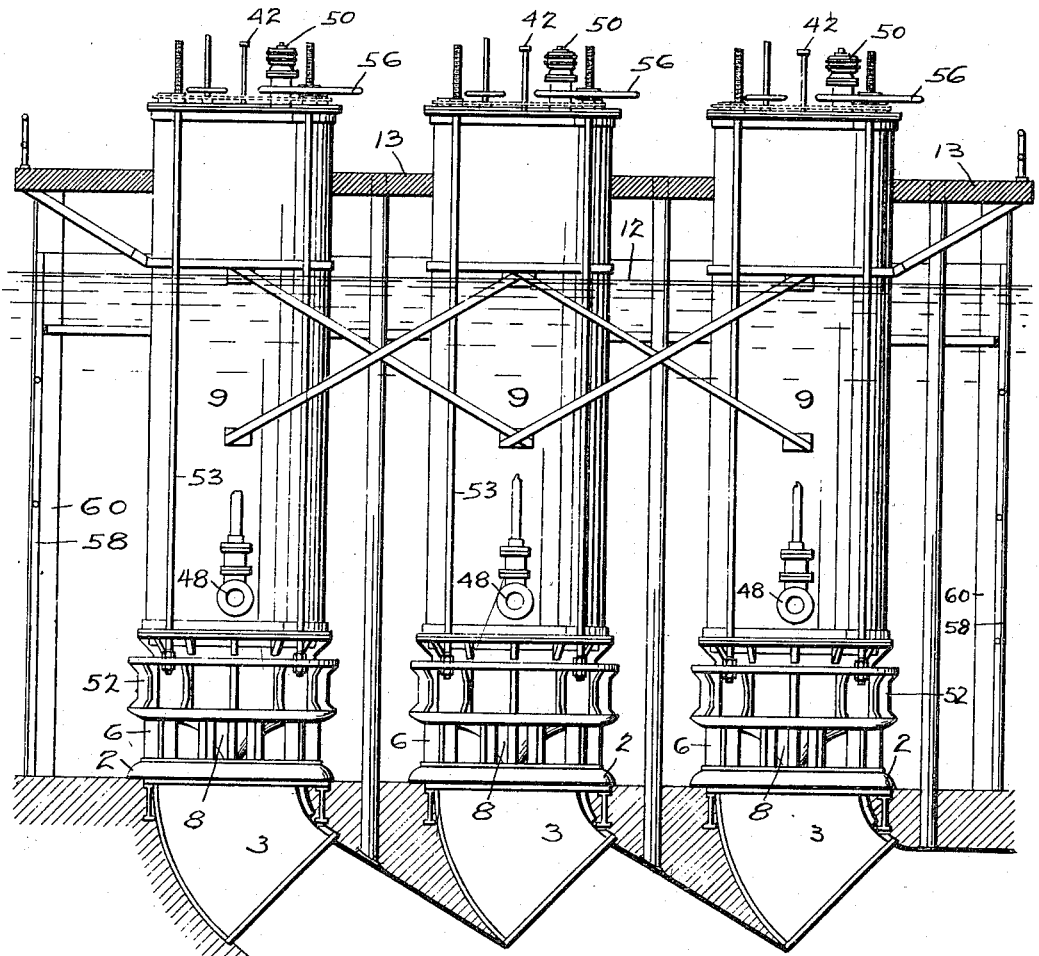

W. A. DOBLE.
INTAKE VALVE.
APPLICATION FILED MAY 12, 1913.

1,169,136.

Patented Jan. 25, 1916.
6 SHEETS—SHEET 6.

WITNESSES:
J. B. Gardner
H. G. Prost.

INVENTOR.
W. A. DOBLE
BY Miller & White
HIS ATTORNEYS.

UNITED STATES PATENT OFFICE.

WILLIAM A. DOBLE, OF SAN FRANCISCO, CALIFORNIA, ASSIGNOR TO PELTON WATER WHEEL COMPANY, OF SAN FRANCISCO, CALIFORNIA, A CORPORATION OF CALIFORNIA.

INTAKE-VALVE.

1,169,136.      Specification of Letters Patent.      Patented Jan. 25, 1916.

Application filed May 12, 1913. Serial No. 766,947.

*To all whom it may concern:*

Be it known that I, WILLIAM A. DOBLE, a citizen of the United States, and a resident of the city and county of San Francisco, State of California, have invented certain new and useful Improvements in Intake-Valves, of which the following is a specification.

The invention relates to intake valves adapted to control the flow of water from a reservoir or other source into pipe lines or conduits, and more particularly to intake valves which are arranged below the surface of the water.

The object of the invention is to provide an intake valve for governing the flow of water into a pipe line or conduit.

Another object of the invention is to provide a needle intake valve.

A further object of the invention is to provide a controlling valve which allows the water to enter the conduit with the least disturbance.

A further object of the invention is to provide an auxiliary valve in combination with the needle valve which operates to shut off the flow of water so that the needle and its coacting parts may be readily removed when desirable or necessary.

The invention possesses many other objects and advantageous features, which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by such drawings and description, as I may adopt many variations within the scope of my invention as set forth in said claims.

Figure 2:
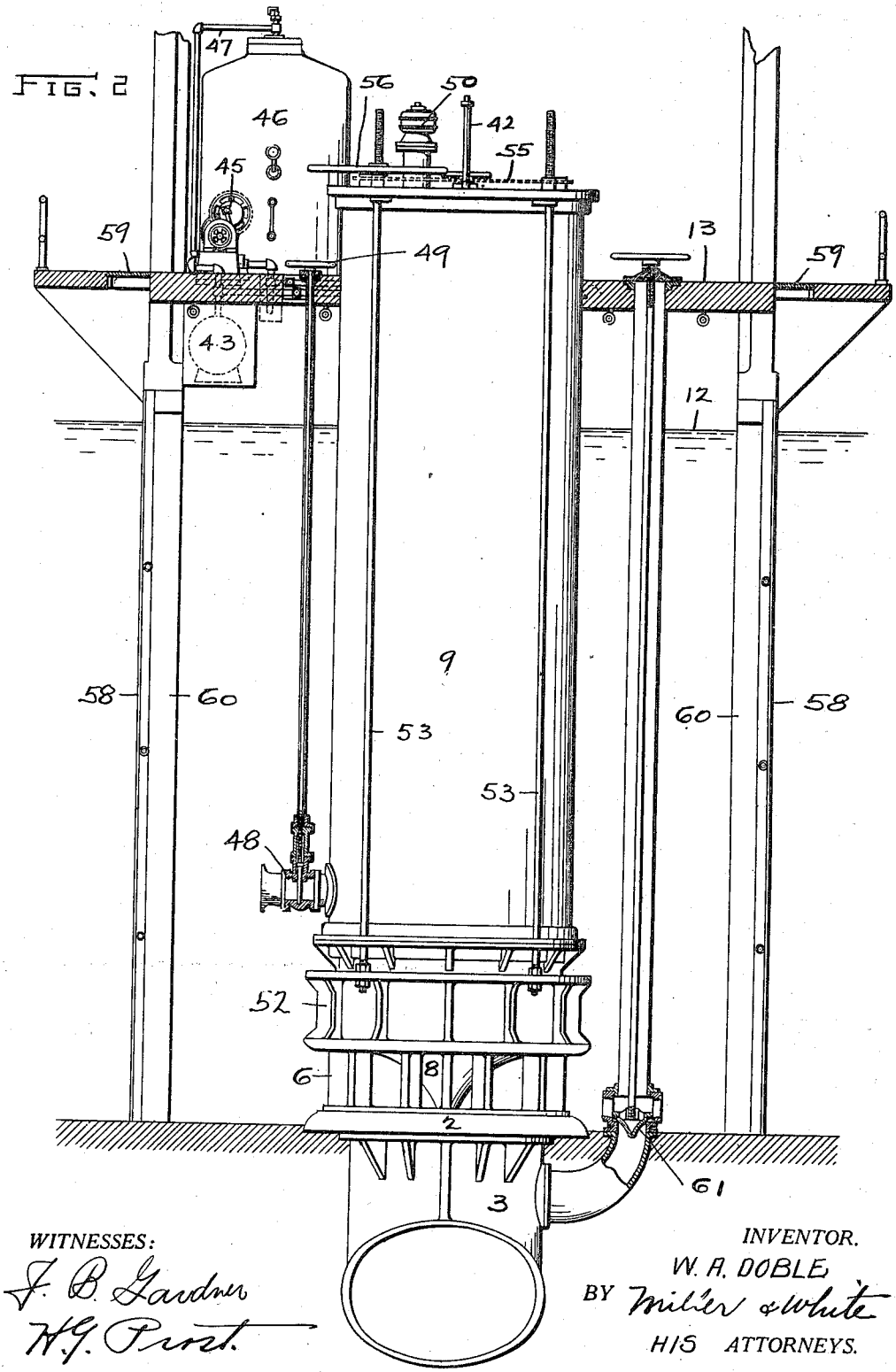
Figure 3:
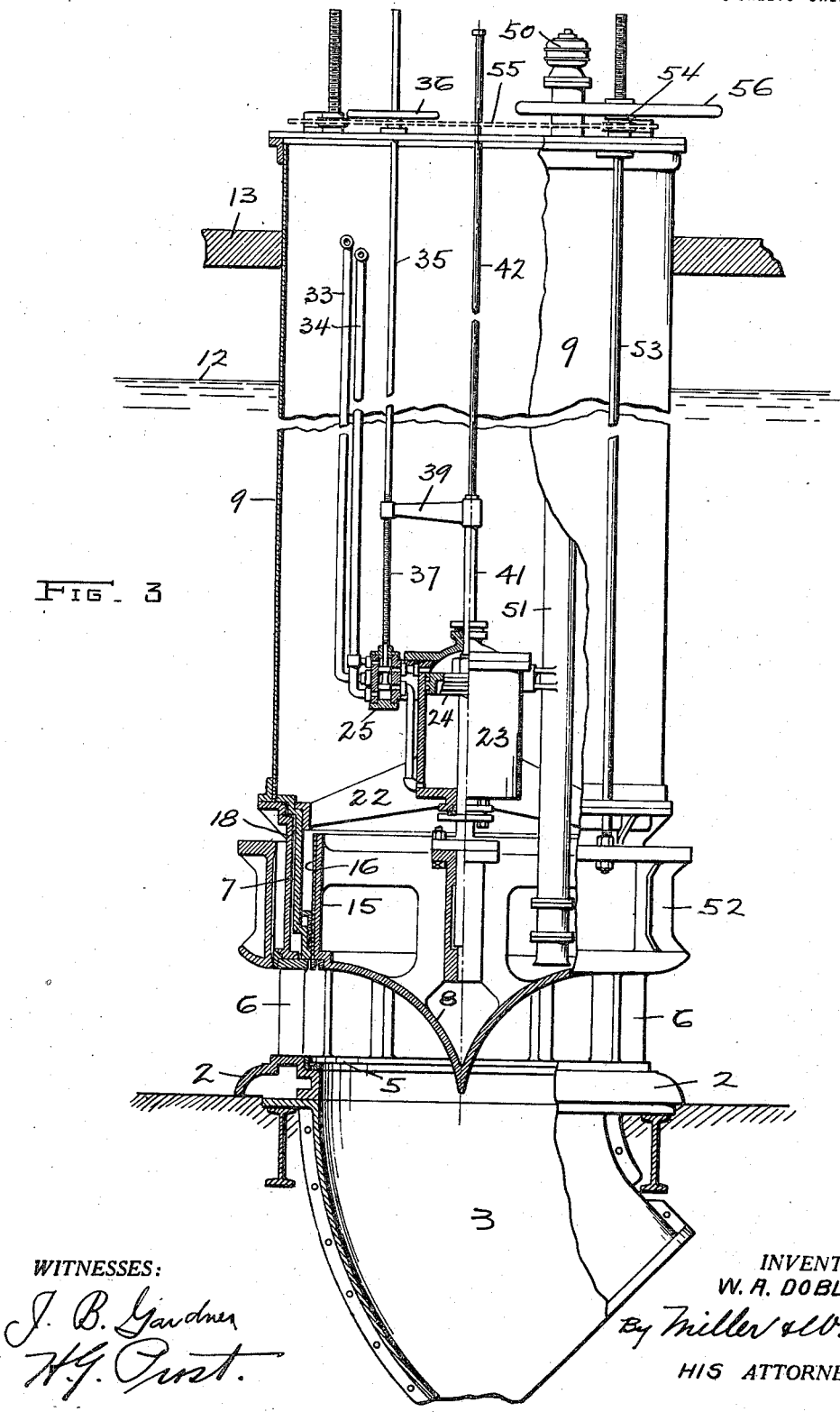
Figure 4:
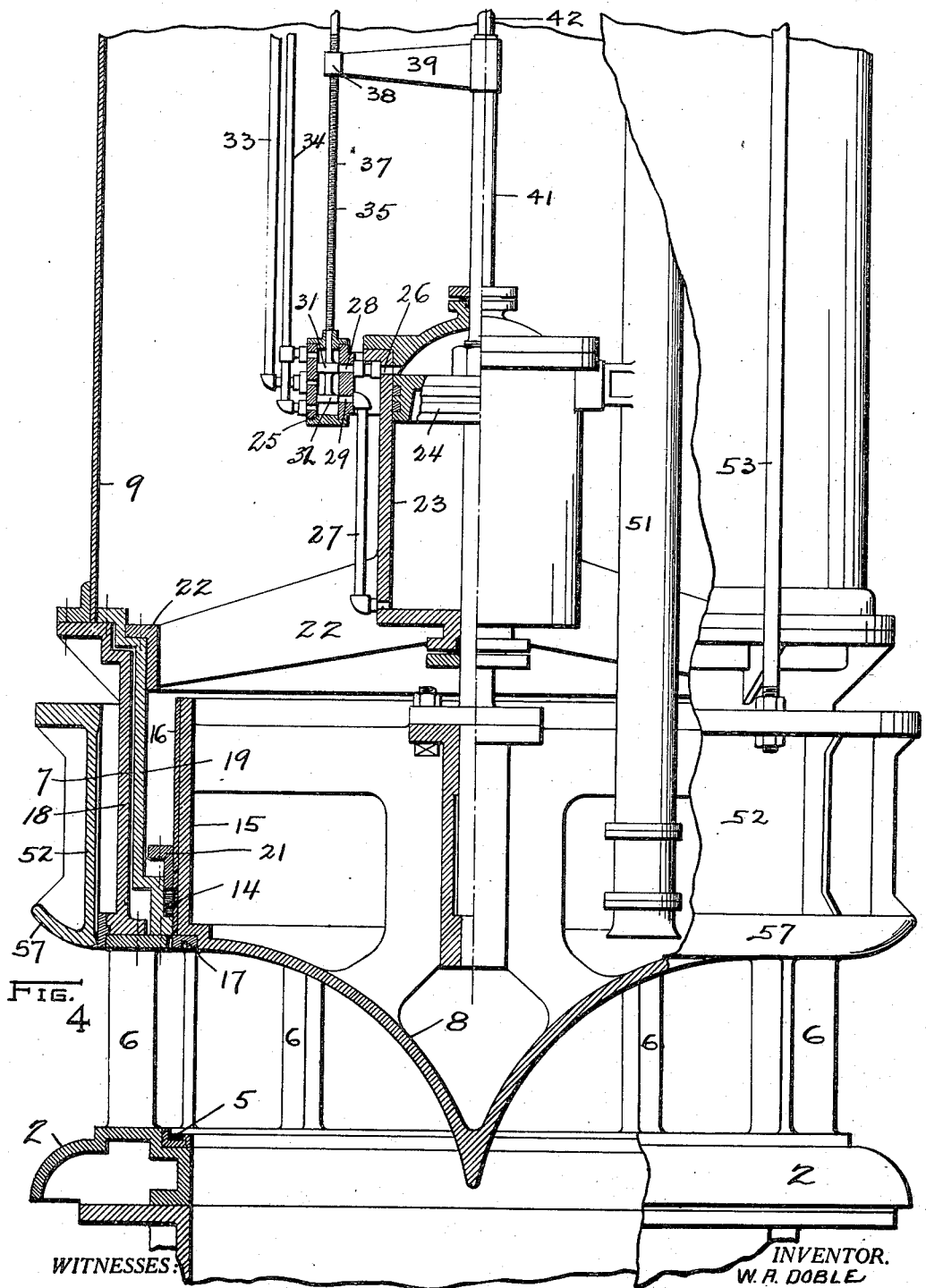
Figure 5:
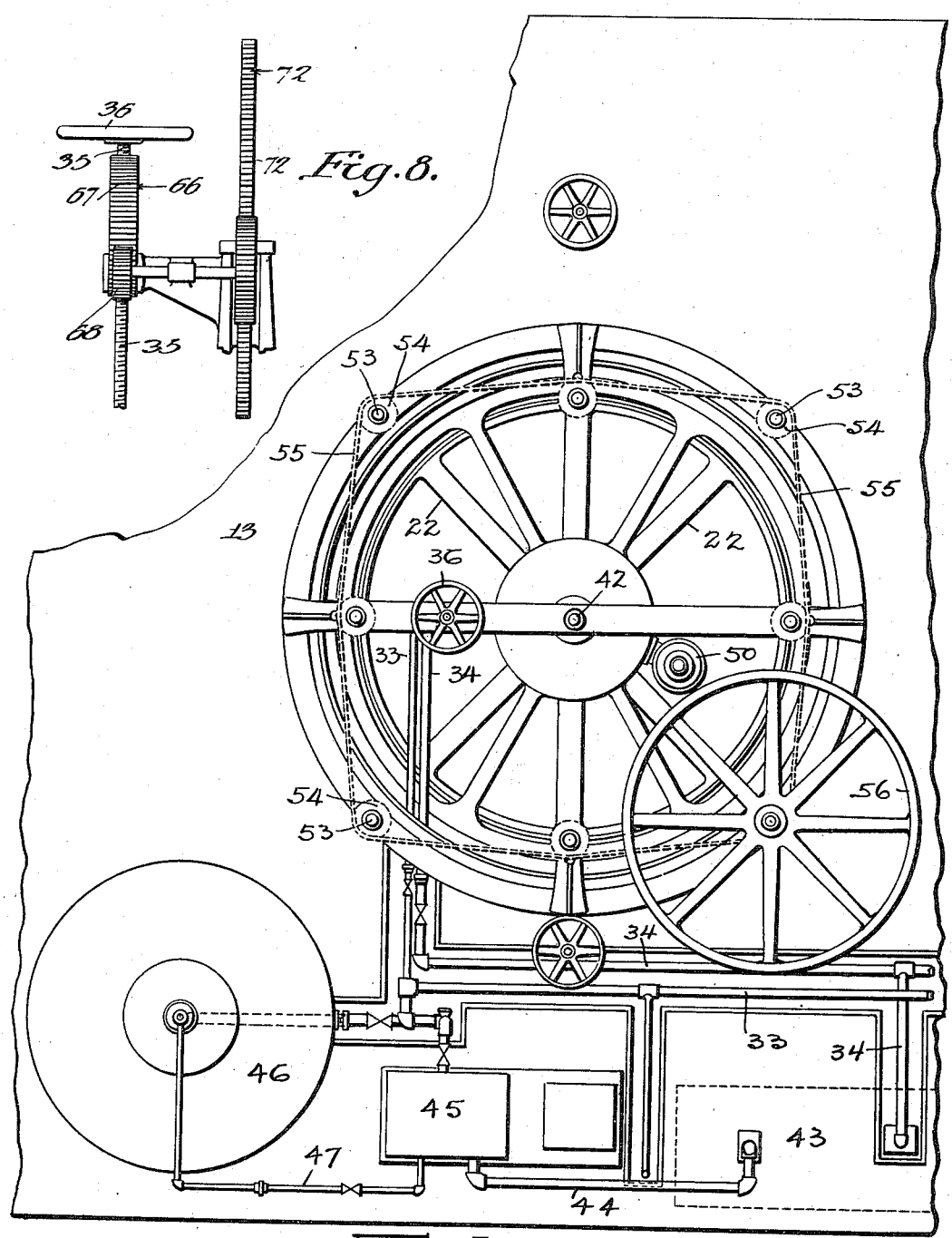
Figure 6:
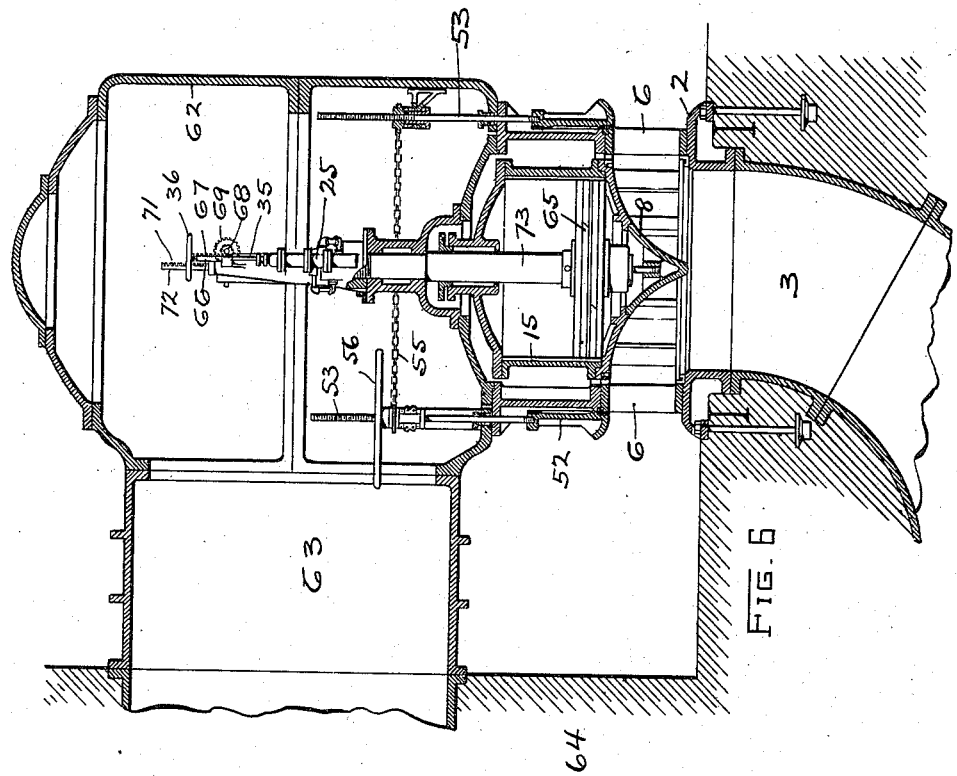
Figure 7:
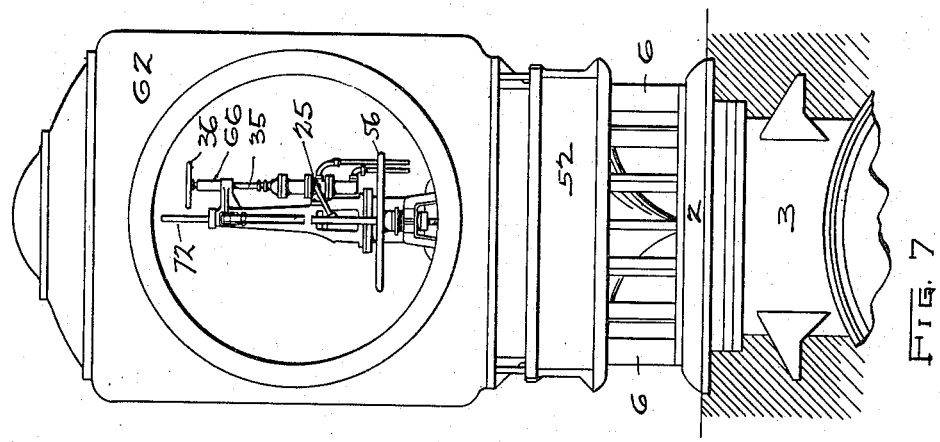

Referring to said drawings: Figure 1 is an elevation, partly in section, of one installation of the valves of my invention. Fig. 2 is an elevation of one valve taken at right angles to the view shown in Fig. 1, showing part of the operating mechanism. Fig. 3 is an elevation of the valve, partly in cross section, part thereof being broken away to reduce the size of the figure. Fig. 4 is an elevation, partly in cross section, of the central part of the structure shown in Fig. 3, on a larger scale. Fig. 5 is a plan view of the valve operating mechanism. Fig. 6 is a cross sectional elevation of a modified form of construction. Fig. 7 is an elevation taken at right angles to Fig. 6. Fig. 8 is a detail of a portion of the valve operating mechanism shown in Figs. 6 and 7.

The valve of my invention is particularly adapted to be installed below the surface of the water in the reservoir, or adjacent the bottom thereof, so that advantage may be taken of the head of water in the reservoir, and so that a variation of the level of the water in the reservoir will be substantially immaterial. The valves are designed not only to establish or cut off communication between the conduit and the water supply, but to control the opening, so that the desired amount of water may be obtained. The construction is such that the water enters the conduit or tunnel with the least disturbance, thereby avoiding to a great degree eddy currents and the erosion of the concrete lining of the tunnel. The flow of the water into the tunnel may be controlled by one or more valves, depending upon the amount of water necessary at the power plant or upon other considerations. In the construction shown in Fig. 1, which was designed to be installed in the mountains, it was necessary to construct three separate units in order that the weight of any single piece should not be too great for the transportation facilities available.

The base of each valve is preferably set in concrete for obvious reasons, and is suitably supported and anchored so that it is fixed and practically permanent. Below the base ring 2 is preferably arranged a quarter turn elbow 3 which receives the incoming water and directs it into the tunnel or conduit 4 with the least amount of disturbance, thereby avoiding erosion of the concrete lining. The circular base 2 serves as the main base for the entire construction and also acts as a support for and carries the lower valve seat 5, which is preferably made in the form of a steel ring.

Supported above the base 2, by the columns 6, spaced apart circumferentially, is a cylindrical construction 7, upon which the main controlling valve or plate 8 is carried, the valve being preferably formed in the shape of a needle valve. Securely attached to the upper part of the cylindrical construction 7, is a caisson 9 which extends above the level of the water 12 and preferably above the operating platform 13. The joint between the needle 8 and the cylindrical construction 7 is securely packed with a suitable packing 14, held in place by the usual packing gland, thereby preventing the water from entering the caisson, allowing the various parts lying therein to be accessible for inspection or repair.

The main needle 8 is preferably formed hollow and is suitably braced on the interior to withstand the pressure of the water. The body portion 15 of the needle is preferably formed cylindrical in shape and the height of the body is such that the sides thereof engage the packing 14 for all positions of the needle. The body of the needle may be provided with a bronze jacket 16 to prevent corrosion and to maintain a smooth surface in contact with the packing 14, thereby preventing leakage into the interior of the caisson.

The needle is arranged concentrically with regard to the opening in the base plate 2, and operates to guide the water smoothly into the elbow 3. The outer surface of the base plate is also preferably curved to reduce the water disturbance as much as possible. Arranged on the needle, preferably at the periphery thereof, is the upper gate seat 17 which, when the needle is lowered, engages the lower gate seat 5, fixed on the base plate. The lower gate seat ring is provided with a groove in which a special metal is inserted to make a tight replaceable gate seat.

The cylindrical construction 7 consists of the main cylinder 18 which is attached at its lower end to the columns 6 and bolted at its upper end to the flange of the caisson 9. Arranged within the cylinder 18 and preferably bolted thereto and spaced apart slightly therefrom is the cylinder 19 to which is attached the gland 21 for holding the packing 14. The cylinder 19 is usually provided on its upper end with a shoulder against which the frame 22 which supports the needle and its operating mechanism rests, and to which it is bolted.

Supported on the frame 22 is a cylinder 23, alined with the axis of the needle, in which the piston 24, connected to the needle, is movable. The movement of the piston 24 is controlled by the valve 25 which is preferably of the sliding piston type. The cylinder 23 is provided with two conductors 26—27 connecting the spaces in the cylinder above and below the piston with the apertures 28—29 in the valve 25. The piston of the valve 25 is provided with two heads 31—32 which are adapted to simultaneously close both apertures 28 and 29, thereby locking piston 24 in position. The piston 24 is operated by fluid, preferably oil, under pressure which is introduced into the valve 25 through the conductor 33 into the space lying between the two piston heads 31—32. The oil discharged from the cylinder 23 passes out the valve body 25 through the conductor 34 which connects with the valve body above and below the piston heads 31—32 respectively. An upward movement of the valve piston rod or valve stem 35 will place the upper part of cylinder 23 in communication with the oil supply pipe 33 and the lower part in connection with the exhaust pipe 34, thereby causing the piston 24 to move downward. A downward movement of the valve stem operates similarly to cause an upward movement of the piston 24.

The valve stem 35 extends upward above the level of the operating platform 13 and is provided adjacent its upper end with means for rotating it, such as the hand wheel 36. This rotary motion is converted into a longitudinal motion by means of the screw threaded portion 37 of the valve stem engaging in a screw threaded boss 38, carried by the arm 39. The arm 39 is fixed upon the rod 41 which is secured to and moves with the piston 24, and an indicating rod 42 attached to rod 41 or forming an extension thereof, extends above the operating platform, to indicate the position of the needle.

As the hand wheel 36 is rotated in the proper direction, the valve stem 35, due to its engagement with the boss 38, is moved upward, allowing oil under pressure to enter the cylinder 23 above the piston 24 and allowing the oil in the cylinder below the piston to discharge. The resulting downward movement of the piston, operating through the rod 41 and the arm 39, moves the valve stem 35 downward until the passages 28 and 29 in the valve body are closed. In order to close the needle valve completely the hand wheel 36 must be rotated until the indicating rod shows that the valve is closed. It is evident that for a given rotation of the hand wheel the needle moves a certain distance and is locked in that position, so that the needle valve may be readily set for any desired flow of water. As soon as the needle has moved to the amount provided for by the rotation of the hand wheel, the valve is brought back to the neutral position by the movement of the piston, so that the actual movement of the needle follows exactly the movement of the controlling valve. The screw threaded portion on the valve stem should be of a length at least equal to the full stroke of the piston 24, to allow for the travel of the boss 38. By continuously rotating the hand wheel 36, the needle is caused to move continuously, and when the rotation of the hand wheel ceases, the needle is locked in position.

The oil discharged from the cylinder 23 flows through the pipe 34 to the storage tank 43, whence it is drawn through the conductor 44 to the pump 45 and forced into the pressure supply tank 46. The desired pressure is maintained in tank 46 by air, which is pumped in through the pipe 47. All of the various conductors and pipes are provided at suitable points with valves, to control the flow of the fluids. The pressure tank 46 is preferably made of such capacity that in the event of a failure or breaking down of the pumping mechanism, there would be sufficient oil under pressure to allow the operator to close all of the intake valves in the installation. The pressure is preferably derived from a pump operated by an electric motor, which is provided with an automatic pressure control so that the pressure in the tank is automatically maintained substantially constant.

Emergency means are provided for shutting the needle valves, should for any reason the pressure fluid system fail to operate. Arranged in the side of the caisson 9 is an inlet controlled by the gate valve 48, which is operated by the hand wheel 49, arranged on the operating platform. When this valve 48 is opened the caisson fills with water, the weight thereof, operating in conjunction with the weight of the needle, being sufficient to force the needle downward to its seat and close the intake valve. A centrifugal pump, driven by the motor 50 draws water through the pipe 51 arranged within the caisson, thereby providing means for removing any leakage water or any water which has been admitted through valve 48. Means are also provided for shutting off the supply of water to the needle valve, or for temporarily controlling the supply, when it is desirable or necessary to remove or repair the needle or any of its coacting parts.

Surrounding the cylindrical construction 7, and preferably guided thereby, is a vertically movable cylindrical gate 52, which is supported on the suspension rods 53. The suspension rods extend upward through the operating platform and are screw-threaded at their upper ends for engagement with the nuts 54. The nuts 54 are formed in the shape of sprocket wheels which are engaged by the chain 55, so that all of the nuts rotate together, thereby causing the cylindrical gate to be raised or lowered evenly. One of the nuts 54 is provided with a hand wheel 56, for operating the gate. The lower edge of the gate 52 is provided with an upwardly curved flange 57, which, when the gate is raised, constitutes an extension of the main needle, forming a smooth surface to guide the water. When the gate is lowered the lower edge thereof engages a seat in the base ring 2, closing the water inlet.

Surrounding the entire valve structure and extending upward above the level of the water is a grillage 58 which operates to prevent sticks, trees and other foreign substances from entering the valve and finding their way into the tunnel and to the hydraulic power apparatus. The operating platform is preferably supported on piers 60 between which the grillage is arranged, and trap-doors 59 are provided in the platform to allow the accumulated trash to be cleared from the grillage.

In order to avoid the inrush of water into the tunnel or conduit when the main valve is initially opened, I provide a supplemental needle valve 61, opening into the conduit, which is opened to allow the conduit to fill before the main valve is opened. This obviates the destructive effect that would be produced should the main valve be opened when the conduit is empty.

In the construction shown in Figs. 6 and 7 the operating mechanism is arranged in a closed chamber 62 arranged below the surface of the water, to which access may be had through a tunnel 63 which extends through the dam or bank 64 of the reservoir. In this construction the needle operating cylinder is the cylindrical body 15 of the needle in which is arranged the stationary piston 65. The cylindrical body 15 is closed at the top and bottom, forming closed chambers on opposite sides of the piston. Oil under pressure is admitted to either chamber through the valve 25 which is operated by the hand wheel 36. The valve stem 35 is screw-threaded and engages a non-rotatable longitudinally movable sleeve 66, provided on one face with a rack 67 engaging a pinion 68. Mounted on the pinion shaft is a second pinion 69 engaging a rack 71 on the bar 72 which is connected to and moves with the needle. The bar 72 operates as an indicating rod to indicate the position of the needle. A rotation of the hand wheel 36 in the proper direction so that the valve stem moves upward, causes oil under pressure to be introduced into the cylinder body 15 below the piston, through a conduit in the piston rod 73, thereby causing the needle to move downward. This causes a downward movement of the rack 71 and consequently a downward movement of the sleeve 66, which movement tends to close the valve 25. The pinions 68 and 69 are preferably of different sizes as shown so that the movement of the sleeve 66 will be less than the movement of the needle, a feature which is desirable in the confined space in the chamber.

I claim:

1. An intake valve comprising a base ring, a needle arranged above and axially alined with said base ring, a cylinder arranged above said needle, a piston in said cylinder dividing it into two chambers, a valve for controlling the inflow and discharge of fluid into and from said chambers, a screw threaded valve stem for operating said valve, means for rotating said valve stem, and a screw-threaded boss attached to said piston engaging the screw-threaded portion of said valve stem.

2. An intake valve adapted to be arranged below the level of a body of water, comprising a base ring, an open structure mounted on said base ring, a cylindrical structure mounted on said open structure and adapted to extend above the level of the water, a needle arranged above and axially alined with said base ring, means for moving said needle, means for locking said needle in any desired position, and a rod attached to said needle and extending upward through the top of said cylindrical structure, said rod adapted to indicate the position of the needle.

3. An intake valve adapted to be arranged below the level of a body of water, comprising a base ring, an open structure mounted on said base ring, a cylindrical structure mounted on top of said open structure and adapted to extend above the level of the water, a vertically movable needle arranged at the lower end of said cylindrical structure, and a packing arranged between said structure and said needle.

4. An intake valve adapted to be arranged below the level of a body of water, comprising a base ring, an open structure mounted on said base ring, a cylindrical structure mounter on top of said open structure and adapted to extend above the level of the water, a vertically movable needle arranged at the lower end of said cylindrical structure, a packing arranged between said structure and said needle, and means for allowing water to enter said structure.

5. An intake valve adapted to be arranged below the level of a body of water comprising a base ring, an open structure mounted on said base ring, a cylindrical structure mounted on top of said open structure and adapted to extend above the level of the water, a vertically movable needle arranged at the lower end of said cylindrical structure, a packing between said needle and said structure, controllable means for permitting water to flow into said structure, and means for exhausting the water from said structure.

6. An intake valve adapted to be arranged below the level of a body of water comprising a base ring, an open structure mounted on said base ring, a cylinder mounted on said open structure, a caisson mounted on said cylinder and extending above the level of the water, a needle having a cylindrical body arranged in said cylinder, and a packing arranged between said cylinder and said cylindrical body.

7. An intake valve adapted to be arranged below the level of a body of water comprising a base ring, an open structure mounted on said base ring, a cylinder mounted on said open structure, a caisson mounted on said cylinder and extending above the surface of the water, a second cylinder arranged within said first cylinder and secured thereto, a needle having a cylindrical body arranged within said second cylinder, a packing between said second cylinder and said cylindrical body, and means for moving said needle.

8. An intake valve adapted to be arranged below the level of the water, comprising a base ring, an open structure mounted on top of said ring, a closed structure mounted on said open structure and adapted to extend above the level of the water, a needle having a cylindrical body arranged within said closed structure and adapted to coact with said base ring to control the flow of water therethrough, fluid pressure operated means for moving said needle, means for controlling the flow of the pressure fluid to said needle moving means, and means operative by the movement of the needle for controlling said controlling means.

9. In an intake valve, a base ring, a needle arranged above and axially alined with said base ring, a fixed closed end cylinder arranged above said needle, a piston in said cylinder dividing it into two compartments, a piston rod connecting said needle and piston, a rod attached to said piston and extending upwardly from the cylinder, a sliding piston valve for controlling the inflow and discharge of pressure fluid from said chambers, a valve stem having a screw-threaded portion, a screw-threaded boss attached to said upwardly extending rod engaging said screw-threaded portion of the valve stem and adapted to cause a rotation of the valve stem to move said valve stem longitudinally, said valve being arranged so that an upward movement of the valve stem causes a downward movement of the needle, and means for rotating said valve stem.

In testimony whereof, I have hereunto set my hand at San Francisco, California, this 2nd day of May 1913.

WILLIAM A. DOBLE.

In presence of—
  H. G. Prost,
  P. S. Pidwell.

Copies of this patent may be obtained for five cents each, by addressing the "Commissioner of Patents, Washington, D. C."